(12) United States Patent
Winder (10) Patent No.: US 8,126,275 B2
(45) Date of Patent: Feb. 28, 2012

(54) INTEREST POINT DETECTION

(75) Inventor: Simon Winder, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1344 days.

(21) Appl. No.: 11/739,672

(22) Filed: Apr. 24, 2007

(65) Prior Publication Data

US 2008/0267506 A1    Oct. 30, 2008

(51) Int. Cl.
*G06K 9/46*    (2006.01)

(52) U.S. Cl. ........ 382/225; 382/190; 382/224; 382/227; 345/612; 345/694; 707/737

(58) Field of Classification Search .................. None
See application file for complete search history.

(56) References Cited

U.S. PATENT DOCUMENTS

| | | | |
|---|---|---|---|
| 6,055,334 A * | 4/2000 | Kato ............................. | 382/190 |
| 6,157,737 A | 12/2000 | Ishikawa et al. | |
| 6,343,150 B1 | 1/2002 | Darrell et al. | |
| 6,687,416 B2 * | 2/2004 | Wang ............................. | 382/278 |
| 6,941,022 B2 | 9/2005 | Shibata et al. | |
| 7,076,093 B2 | 7/2006 | Lee et al. | |
| 7,139,421 B1 * | 11/2006 | Fix et al. ....................... | 382/141 |
| 7,949,186 B2 * | 5/2011 | Grauman et al. ............. | 382/170 |
| 2003/0107678 A1 | 6/2003 | Lin et al. | |
| 2003/0108242 A1 | 6/2003 | Concant | |
| 2005/0048456 A1 * | 3/2005 | Chefd'hotel et al. ......... | 434/267 |
| 2005/0238198 A1 * | 10/2005 | Brown et al. ................. | 382/103 |
| 2005/0286757 A1 | 12/2005 | Zitnick et al. | |
| 2005/0286767 A1 * | 12/2005 | Hager et al. .................. | 382/190 |
| 2006/0002609 A1 | 1/2006 | Casadei | |
| 2006/0083429 A1 | 4/2006 | Joly | |
| 2006/0257028 A1 | 11/2006 | Laurent et al. | |
| 2007/0217676 A1 * | 9/2007 | Grauman et al. ............. | 382/170 |

OTHER PUBLICATIONS

Belongie, S., J. Malik, and J. Puzicha, Shape matching and object recognition using shape context, IEEE Trans. on Pattern Analysis of Machine Intelligence, 2002, pp. 509-522, vol. 24.
Brown, M., R. Szeliski, and S. Winder, Multi-image matching using multi-scale oriented patches, Proc. IEEE Conf. on Computer Vision and Pattern Recognition, 2003, pp. 510-517, vol. 1.
Carneiro, G., and A. D. Jepson, Multi-scale phase-based local features, Proc. IEEE Conf. on Computer Vision and Pattern Recognition, 2003, pp. 736-743, vol. 1.
Fischler, M. A., R. C. Bolles, Random sample consensus: A paradigm for model fitting with applications to image analysis and automated cartography, Comm. of the ACM, 1981, pp. 381-395, vol. 24.

(Continued)

*Primary Examiner* — John Lee
(74) *Attorney, Agent, or Firm* — Lyon & Harr, LLP; Richard T. Lyon (57) ABSTRACT

An interest point detection technique is presented. More particularly, for each of possibly multiple image pyramid resolutions, a cornerness image is generated. One or more potential interest point locations are identified in the cornerness image. This involves finding locations associated with a pixel that exhibits a higher corner strength value than pixels in a prescribed-sized surrounding pixel neighborhood. The potential interest point locations are then clustered to identify groups that likely derive from a same 2D structure. Potential interest point locations in one or more of the identified groups are respectively combined to produce a single location that represents the combined group. The representative location of each group having one is then designated as an interest point. An optional location refinement can also be implemented.

20 Claims, 8 Drawing Sheets

OTHER PUBLICATIONS

Freeman, W. T., and E. H. Adelson, The design and use of steerable filters, IEEE Transactions on Pattern Analysis and Machine Intelligence, Sep. 1991, pp. 891-906, vol. 13, No. 9.

Lazebnik, S., C. Schmid, J. Ponce, Sparse texture representation using affine-invariant neighborhoods, Proc. of the Conf. on Computer Vision and Pattern Recognition, 2003, vol. 2, pp. 319-324, Madison, Wisconsin, USA.

Lowe, D., Object recognition from local scale-invariant features, IEEE Int'l Conf. on Computer Vision, Sep. 1999, pp. 1150-1157, Kerkyra, Corfu, Greece.

Lowe, D., Distinctive image features from scale invariant keypoints, Int. J. of Computer Vision, 2004, pp. 91-110, vol. 60, No. 2.

Mikolajczyk, K., C. Schmid, Indexing based on scale invariant interest points, Proc. 8th Int'l. Conf. Comput. Vis., 2001, pp. 525-531, Vancouver, Canada.

Mikolajczyk, K., and C. Schmid, A performance evaluation of local descriptors, Proc. IEEE Conf. on Computer Vision and Pattern Recognition, 2003, pp. 257-263, Madison, Wisconsin.

Nistér, D., and H. Stewénius, Scalable recognition with a vocabulary tree, IEEE Conf. on Computer Vision and Pattern Recognition, Jun. 2006, pp. 2161-2168, vol. 2.

Pollefeys, M. and L. V. Cool, From images to 3D models, Communications of the ACM, pp. 50-55, vol. 45, No. 7.

Qin, L., Zeng, W., Gao, W., Wang, W., Local invariant descriptor for image matching, IEEE Int'l Conf. on Acoustics, Speech, and Signal Processing, Mar. 18-23, 2005, (ICASSP '05), vol. 2, pp. 1025-1028, Inst. of Comput. Technol., Chinese Acad. of Sci., Beijing, China.

Randen, T. and J.H. Husøy, Filtering for texture classification: A comparative study, IEEE Transactions on Pattern Analysis and Machine Intelligence, 1999, pp. 291-310, vol. 21, No. 4.

Se, S., D. Lowe, and J. Little, Global localization using distinctive visual features, Proceedings of the IEEE/RSJ Conf. on Intelligent Robots and Systems (IROS), Oct. 2002, pp. 226-231, Lausanne, Switzerland.

Snavely, N., S. M. Seitz, R. Szeliski, Photo tourism: Exploring photo collections in 3D, ACM Transactions on Graphics (SIGGRAPH Proceedings), 2006, pp. 835-846, vol. 25, No. 3.

White, R., Newsam, S., Kamath, C., Matching shapes using local descriptors, Lawrence Livermore National Laboratory, UCRL-TR-206057, Aug. 2004.

Faille, F., Adapting interest point detection to illumination conditions, Proc. VIIth Digital Image Computing: Techniques and Applications, Sun C., Talbot H., Ourselin S. and Adriaansen T. (Eds.), Dec. 10-12, 2003, Sydney.

Islam S., A. Sluzek, Z. Lin, M. Joo, Towards invariant interest point detection of an object, Proceedings of the 13th Int'l Conf. in Central Europe on Computer Graphics, Visualization and Computer Vision, pp. 101-104.

Mikolajczyk, K., and C. Schmid, An affine invariant interest point detector, Proc. European Conf. Comp. Vision, 2002, vol. I, pp. 128-142, Copenhagen, Denmark.

Laptev, I., and T. Lindeberg, Interest point detection and scale selection in space-time, Lecture Notes in Computer Science, 2003, vol. 2695, pp. 372-387, L.D. Griffin and M Lillholm, ed., Scale-Space03, Springer Verlag, Berlin, pp. 372-387.

* cited by examiner

INTEREST POINT DETECTION

BACKGROUND

Finding corresponding features in images is an essential component of almost any vision application that tries to extract information from more than one image. For example, vision applications such as image matching and view-based object recognition rely on finding corresponding features in images.

A key step in many methods for finding these corresponding features is to identify so called interest points. In general, an ideal interest point can be defined as a point in an image having a well-defined, often sub-pixel, location in image space, with a local neighborhood that is rich in distinguishing information, and which is substantially invariant to changes in perspective as well as variation in illumination and brightness. Such interest points provide a high degree of repeatability in that the same points are detected in images of the same scene depicting the point, even under different imaging conditions.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The present technique generally involves detecting one or more interest points in an image, typically, although not necessarily, at varying resolutions. More particularly, assuming the multiple resolution embodiment is implemented, the present interest point detection technique involves first forming an image pyramid for the image. For each resolution level of the image pyramid, a cornerness image is generated, which includes a corner strength value for each of its pixels. One or more potential interest point locations are identified in the cornerness image. This involves finding locations associated with a pixel that exhibits a higher corner strength value than pixels in a prescribed-sized surrounding pixel neighborhood. The potential interest point locations are then clustered to identify groups that likely derive from a same 2D structure (e.g., a corner) in the resolution level under consideration. Potential interest point locations in one or more of the identified groups are respectively combined to produce a single location that represents the combined group. Groups considered to be too small in regards to the number of potential point locations can be eliminated from the combining action. The representative location of each group of sufficient size is then designated as an interest point for the resolution level under consideration.

An optional location refinement can also be implemented by first assessing whether an interest point is eligible for location refinement. This can be accomplished by determining if a quadratic surface fitted over a local neighborhood of a prescribed size which is centered on the interest point location exhibits a maximum. If so, the location of eligible interest points is refined. In one embodiment of the present technique, this refinement is accomplished by finding the maximum of the quadratic surface, and designating the sub-pixel location associated with the maximum as the refined interest point location. The refined location of each eligible interest points is designated as a final interest point location for the resolution level under consideration. In addition, for those interest points not eligible for location refinement, the unrefined location of the interest points is designated as a final interest point location for the resolution level.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present interest point detection technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
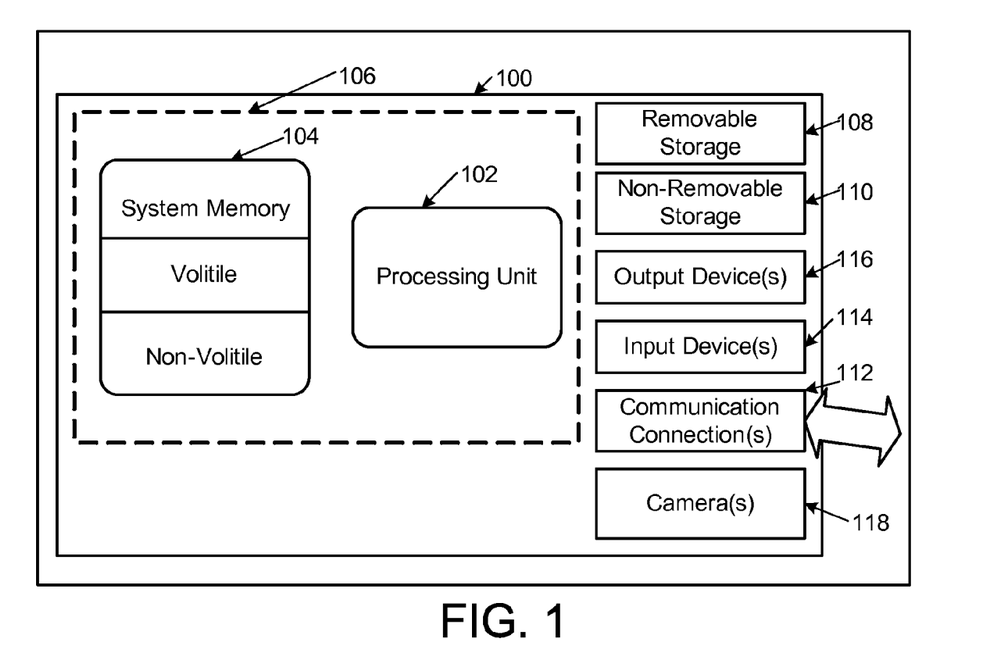
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present interest point detection technique. Neither should the computing environment be interpreted as having any dependency or requirement relating to any one or combination of components illustrated in the exemplary operating environment. With reference to FIG. 1, an exemplary system for implementing the present technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Of particular note is that device 100 can include a camera 118 (such as a digital/electronic still or video camera, or film/photographic scanner), which is capable of capturing a sequence of images, as an input device. Further, multiple cameras 118 could be included as input devices. The images from the one or more cameras are input into the device 100 via an appropriate interface (not shown). However, it is noted that image data can also be input into the device 100 from any computer-readable media as well, without requiring the use of a camera.

The present interest point detection technique may be described in the general context of computer-executable instructions, such as program modules, being executed by a computing device. Generally, program modules include routines, programs, objects, components, data structures, etc. that perform particular tasks or implement particular abstract data types. The present technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present interest point detection technique.

2.0 Interest Point Detection

Figure 2:
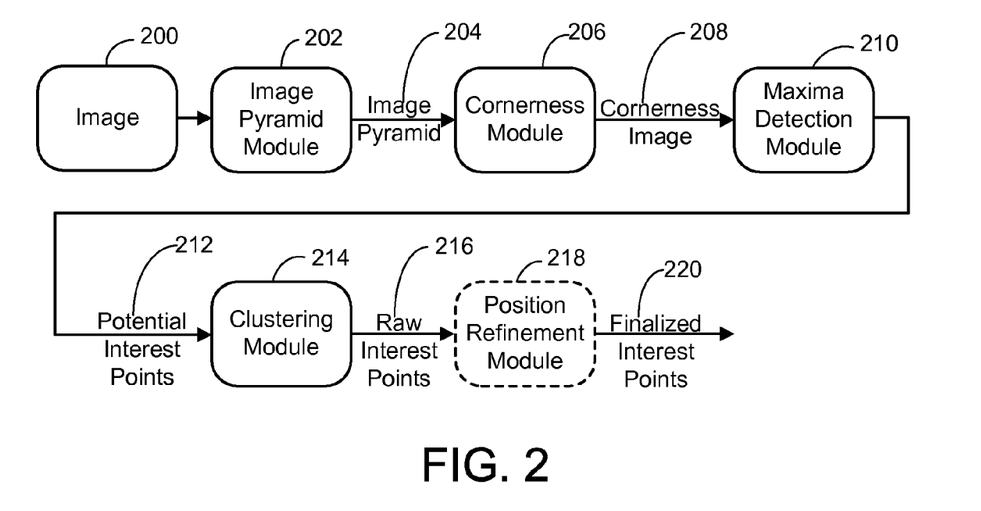
FIG. 2 is a block diagram illustrating the basic modules of the present interest point detection technique.

Referring to FIG. 2, the present interest point detection technique generally involves employing the following modules. The image 200 being examined for interest points is first input into the image pyramid module 202. This module 202 generates a hierarchical series of resolution levels starting with the original image and followed by versions of the original image at progressively decreasing resolutions. The image pyramid data 204 is input into the cornerness module 206. This module 206 generates a cornerness image for each of the image resolution levels. The pixel values of each cornerness image indicate a corner strength computed for that pixel. Cornerness image data 208 for each image resolution level is next input into the maxima detection module 210. This module 210 is the first of a series of modules that define and progressively refine both the number and location of interest points in each resolution level. The maxima detection module identifies locations having higher corner strength than the surrounding local area to produce a number of potential interest point locations. The potential interest point location data for each resolution level 212 is input into a clustering module 214. The clustering module identifies groups of the potential interest points that likely derive from the same 2D structure (e.g., corner) in the associated resolution level. Each of these groups in each level are combined and represented by a single raw interest point. The raw interest point data associated with each resolution level 216 is then input into the position refinement module 218. The position refinement module determines if the location of a raw interest point can be further refined, and if so computes a refined location. The output of the position refinement module 218 is a listing of all the finalized interest point locations 220 for each resolution level of the examined image. It is noted that the position refinement module is optional as indicated by the broken line box in FIG. 2. If position refinement is not undertaken, the clustering module 214 would output the raw interest points as the finalized interest point locations 220 for each resolution level of the examined image.

Figure 3A:
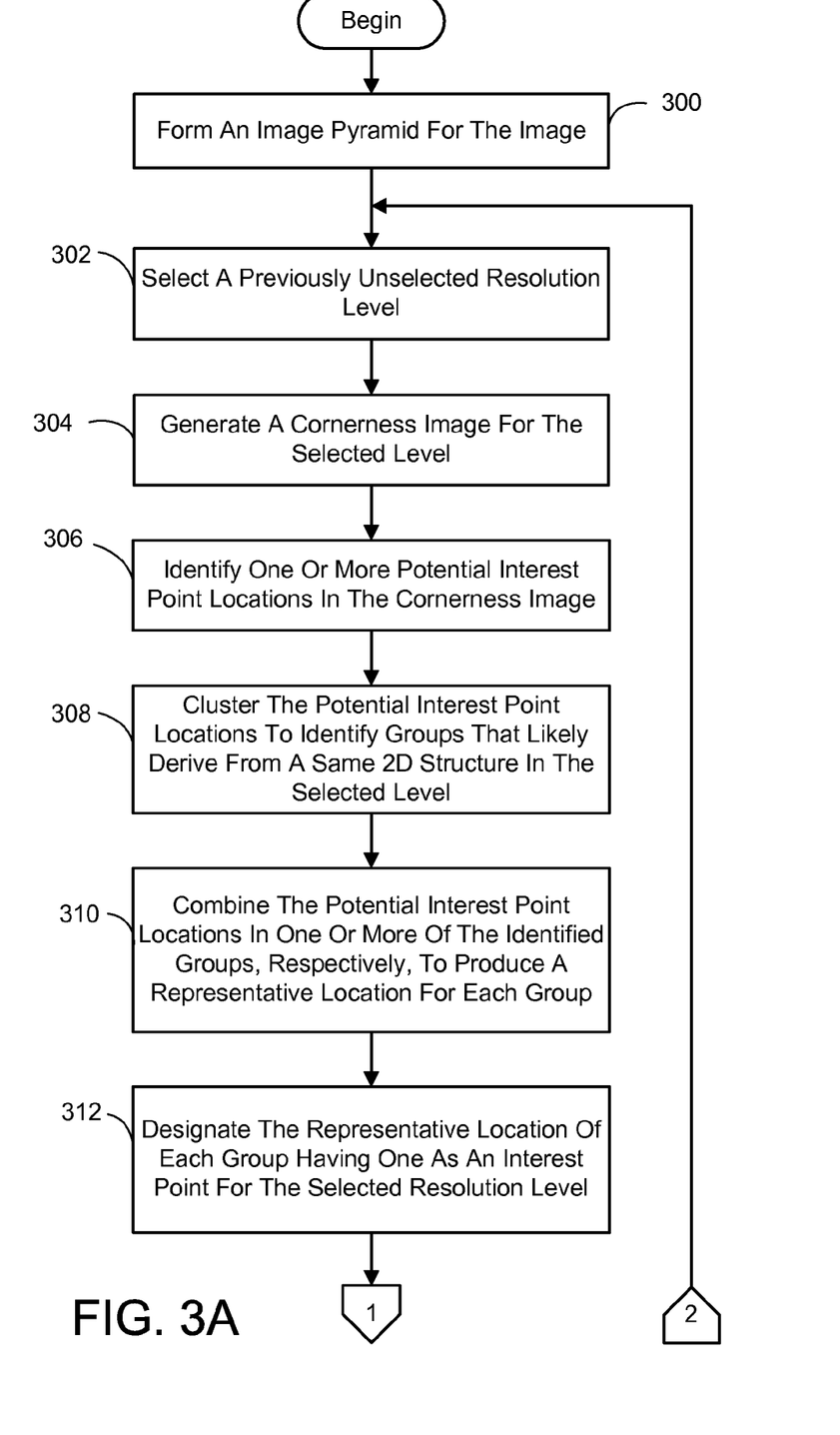
FIGS. 3A-B are a continuing flow diagram generally outlining one embodiment of the overall operation of the modules of FIG. 3 for detecting the location of one or more interest points in an image.
Figure 3B:
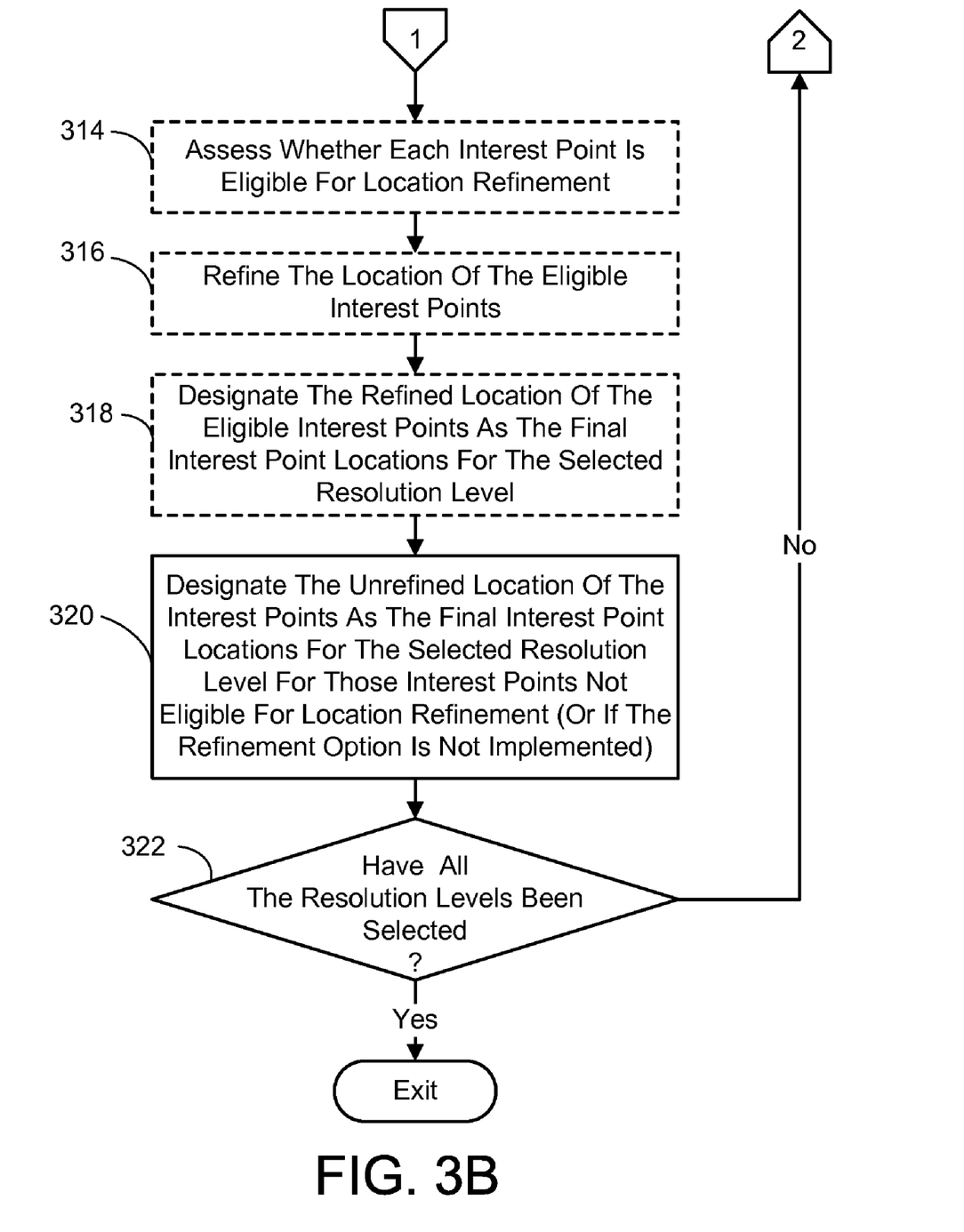

The overall operation of the foregoing modules for detecting the location of one or more interest points in an image is generally shown in the flow diagram of FIGS. 3A-B. The operation begins by forming an image pyramid for the image, which has multiple resolution levels (300). A previously unselected resolution level is selected (302), and a cornerness image is generated for the selected level (304). This cornerness image includes a corner strength value for each of its pixels. Next, one or more potential interest point locations is identified in the cornerness image by finding locations associated with a pixel that exhibits a higher corner strength value than pixels in a prescribed-sized surrounding pixel neighborhood (306). These potential interest point locations are clustered to identify groups that likely derive from a same 2D structure in the selected resolution level (308), and the potential interest point locations in one or more of the identified groups are respectively combined to produce a single location that represents the combined group (310). The reason that not all the groups may be combined to form respective representative locations is that some may be eliminated from further consideration based on their size, as will be described later. The representative location of each group having sufficient size is then designated as an interest point for the selected resolution level (312). Finally, the aforementioned optional location refinement (shown in broken line boxes in FIG. 3B)

can be implemented by first assessing whether each interest point is eligible for location refinement by determining if a quadratic surface fitted over a local neighborhood of a prescribed size which is centered on the interest point location under consideration exhibits a maximum (314). Next, the location of eligible interest points is refined (316). In one embodiment of the present technique, this refinement is accomplished by finding the maximum of the quadratic surface, and designating the sub-pixel location associated with the maximum as the refined interest point location. The refined location of the eligible interest points is designated as the final interest point locations for the selected resolution level (318). For those interest points not eligible for location refinement (or if the refinement option is not implemented), the unrefined location of the interest points is designated as the final interest point location for the selected resolution level (320). It is then determined if all the resolution levels have been selected and processed (322). If not, actions 302 through 322 are repeated. Otherwise the operation ends.

Each of the forgoing modules and their associated operations will now be described in more detail in the sections to follow.

2.1 Image Pyramid

For each input image I(x,y), an image pyramid is formed with the lowest level $P_0(x,y)=I(x,y)$ and higher levels related by smoothing and subsampling operations, i.e., $$P'_l(x,y)=P_l(x,y)*g_{\sigma_p}(x,y)$$

$$P_{l+1}(x,y)=P'_l(sx,sy) \quad (2)$$

where l denotes the resolution level and $g_\sigma(x,y)$ denotes a Gaussian kernel of standard deviation σ. By way of example, but not limitation, a subsampling rate of s=2 and pyramid smoothing of $\sigma_p=1.0$, can be employed for the pyramid forming. However, in general, values in the range of about 1.1 to 3.0 could be used for s and values in the range of about 0.55 to 1.5 could be used for $\sigma_p$. Interest points are extracted from each level of the pyramid.

2.2 Cornerness Image

A cornerness image is employed to quantify the potential of a point in a resolution level of an image being an interest point. This can be accomplished using a variety of methods. While any of these methods can be used, the present technique uses a so-called Harris corners approach. Generally, the Harris corner approach identifies pixels in a resolution level associated with the 2D structure around a point (e.g., like a corner). Graphically, this task could be described as selecting a pixel of the image, defining a window around the point and then moving the window (e.g., shifting the window a prescribed number of pixels in all directions). Each shifted window is compared to the original to determine if there is a high or low correlation. A corner will result in significant changes in the shifted windows no matter which direction it is shifted. Thus, a corner will produce a low correlation in all directions. This condition would indicate the point is a corner.

Mathematically, the Harris corner approach can be implemented as follows. The Harris matrix at level l of the image pyramid and position (x,y) is the smoothed outer product of the gradients, $$H_l(x,y)=\nabla_{\sigma_d}P_l(x,y)\nabla_{\sigma_d}P_l(x,y)^T*g_{\sigma_i}(x,y), \quad (3)$$

where $\nabla_\sigma$ represents the spatial derivative at scale σ, i.e., $$\nabla_\sigma f(x,y)\nabla f(x,y)*g_\sigma(x,y) \quad (4)$$

By way of example, and not limitation, the integration scale can be set to $\sigma_i=1.5$ and the derivative scale set to $\sigma_d=1.0$. However, it is noted that in general values in the range of about 0.5 to 2.5 could be used for $\sigma_i$, and values in the range of about 0.5 to 2.5 could be used for $\sigma_d$.

A cornerness function is then used to compute the corner strength of each pixel in the image resolution level under consideration. This corner strength is a measure of how likely it is that the pixel is a corner pixel. In one embodiment of the present technique a harmonic mean corner detection function is employed. In this function, $$f_{HM}(x,y) = \frac{\det H_l(x,y)}{tr H_l(x,y)} = \frac{\lambda_1\lambda_2}{\lambda_1+\lambda_2}, \quad (5)$$

which is the harmonic mean of the eigenvalues ($\lambda_1$, $\lambda_2$) of H. It is noted that other cornerness functions could also be employed in finding interest point locations. For example, in one alternate embodiment, $$f_H=\lambda_1\lambda_2-0.04(\lambda_1+\lambda_2)^2=\det H-0.04(tr H)^2. \quad (6)$$

In another alternate embodiment, $$f_{ST}=\min(\lambda_1,\lambda_2). \quad (7)$$

The foregoing cornerness function is computed for each pixel of each resolution level of the image, thereby producing a corner strength map or "cornerness image" for each resolution level of the image. These maps identify the corner strength for each pixel of its level.

2.3 Maxima Detection

Due to computational considerations it is desirable to minimize the number of interest points for each image. Thus, it is desirable to identify a smaller number of "strong" interest points, rather than a large number which includes weaker points. It is noted that a strong interest point is one that is readily detectable in the images, even in the face of variations in noise, exposure, illumination, orientation, and the like. The first stage in identifying these strong interest points is referred to as maxima detection.

Figure 4A:
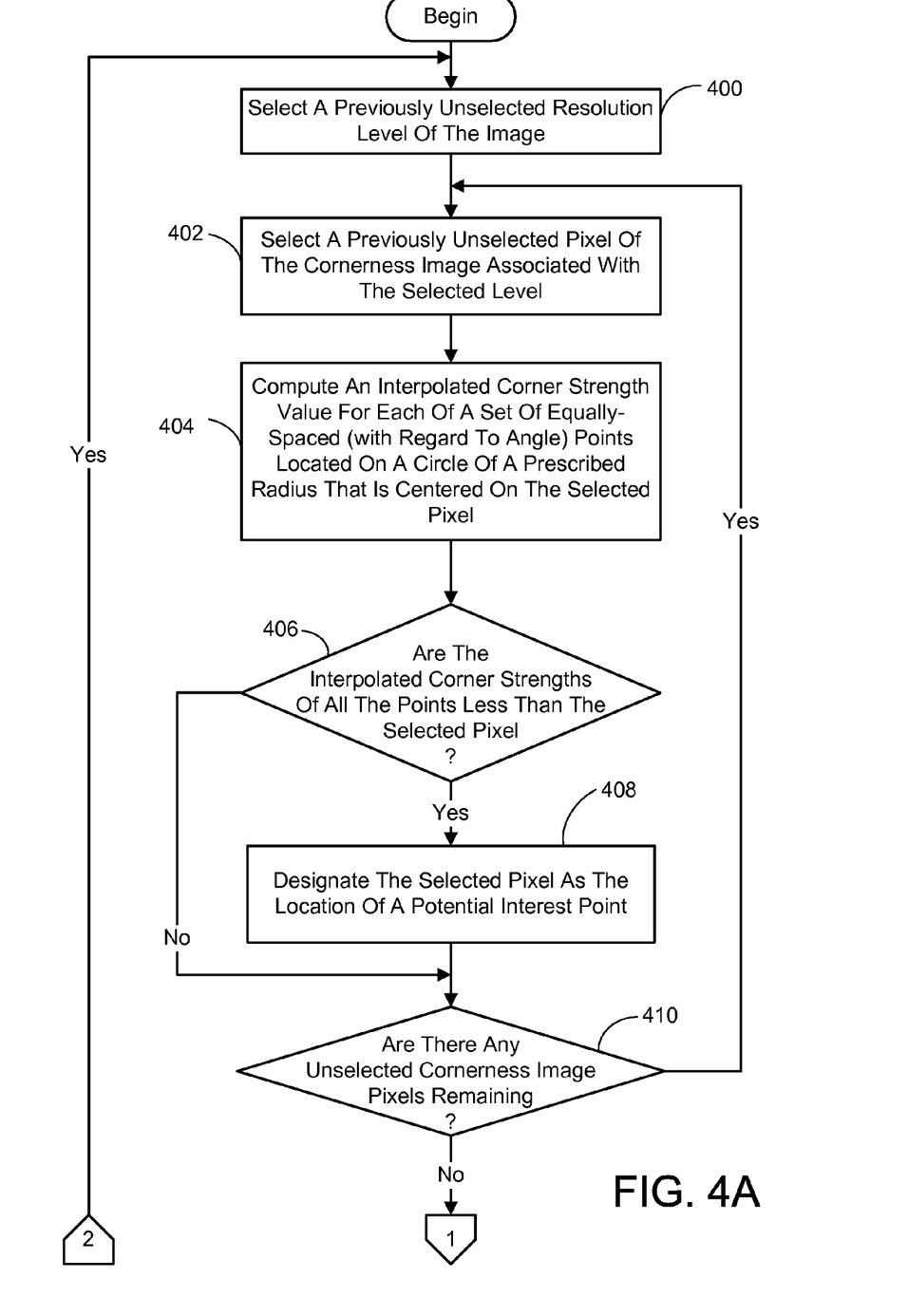
FIGS. 4A-B are a continuing flow diagram generally outlining one embodiment of the maxima detection stage of the present interest point detection technique.
Figure 4B:
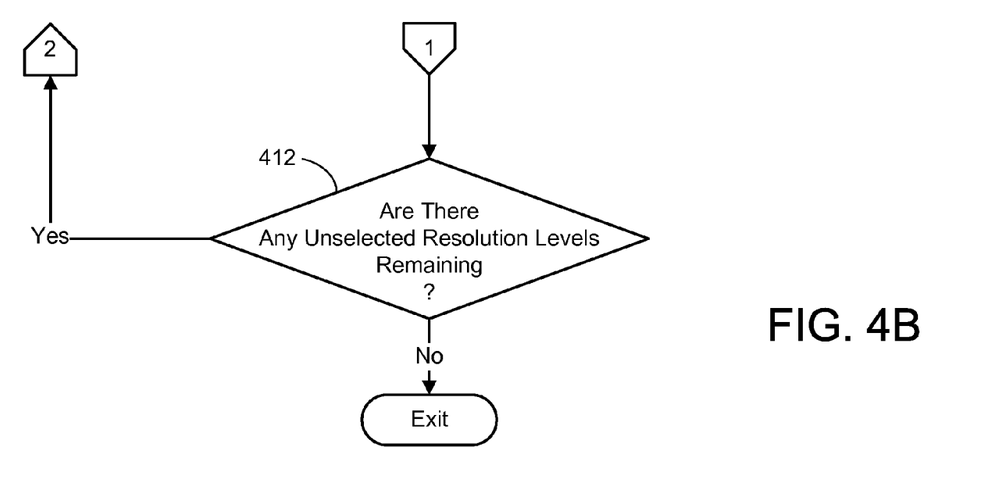

In general, for each resolution level of the image, maxima detection involves finding pixels of the cornerness image whose corner strength is greater than a defined group of pixels found around the pixel. More particularly, referring to FIGS. 4A-B, a previously unselected resolution level of the image being examined is selected (400). This is followed by selecting a previously unselected pixel of the cornerness image computed for the selected resolution level (402). An interpolated corner strength value is then computed for each of a set of equally-spaced (with regard to angle) points located on a circle of a prescribed radius that is centered on the selected pixel (404). The number of points is also prescribed (e.g., 8 or more) and the angular orientation of the circle is arbitrary (although one of the points could line up with the row of pixels containing the selected pixel for the sake of convenience). Any interpolation method can be employed, such as bilinear interpolation, with an assumption that the assigned corner strength value of a pixel is associated with its center. Thus, if a point falls in the area of a pixel but not at its center, the interpolated corner strength value for that point would be computed based on the values of surrounding pixels in proportion to how close the point is the center of those surrounding pixels. In one embodiment of the present technique, the radius was set to 2 pixels. However, the radius can range between about 1 pixels and about 4 pixels. It is next determined if the interpolated corner strengths of all the points are less than that of the selected pixel (406). If so, then the selected pixel is designated as the location of a potential interest point (408). If the selected pixel's corner strength is not greater than the identified surrounding pixels, no action is taken. Regardless of the outcome, it is next determined if there are any remaining pixels in the cornerness image under consideration that have not been selected (410). If there are, then actions 402 through 410 are repeated as appropriate. If not, it is determined if there are any remaining resolution levels of the image that have not been selected and processed (412). If there are, actions 400 through 412 are repeated as appropriate. Otherwise, the maxima detection ends.

2.4 Clustering

The second stage in identifying strong interest points is a clustering stage. The result of the foregoing maxima detection is a group of potential interest point locations for each resolution level of the image. These locations will tend to be grouped near "strong corners" of the image. Accordingly, a clustering approach can be employed to identify which of the potential interest points are likely associated with the same "strong corner". A single interest point location is then computed for each group of potential locations deemed to be related.

Figure 5:
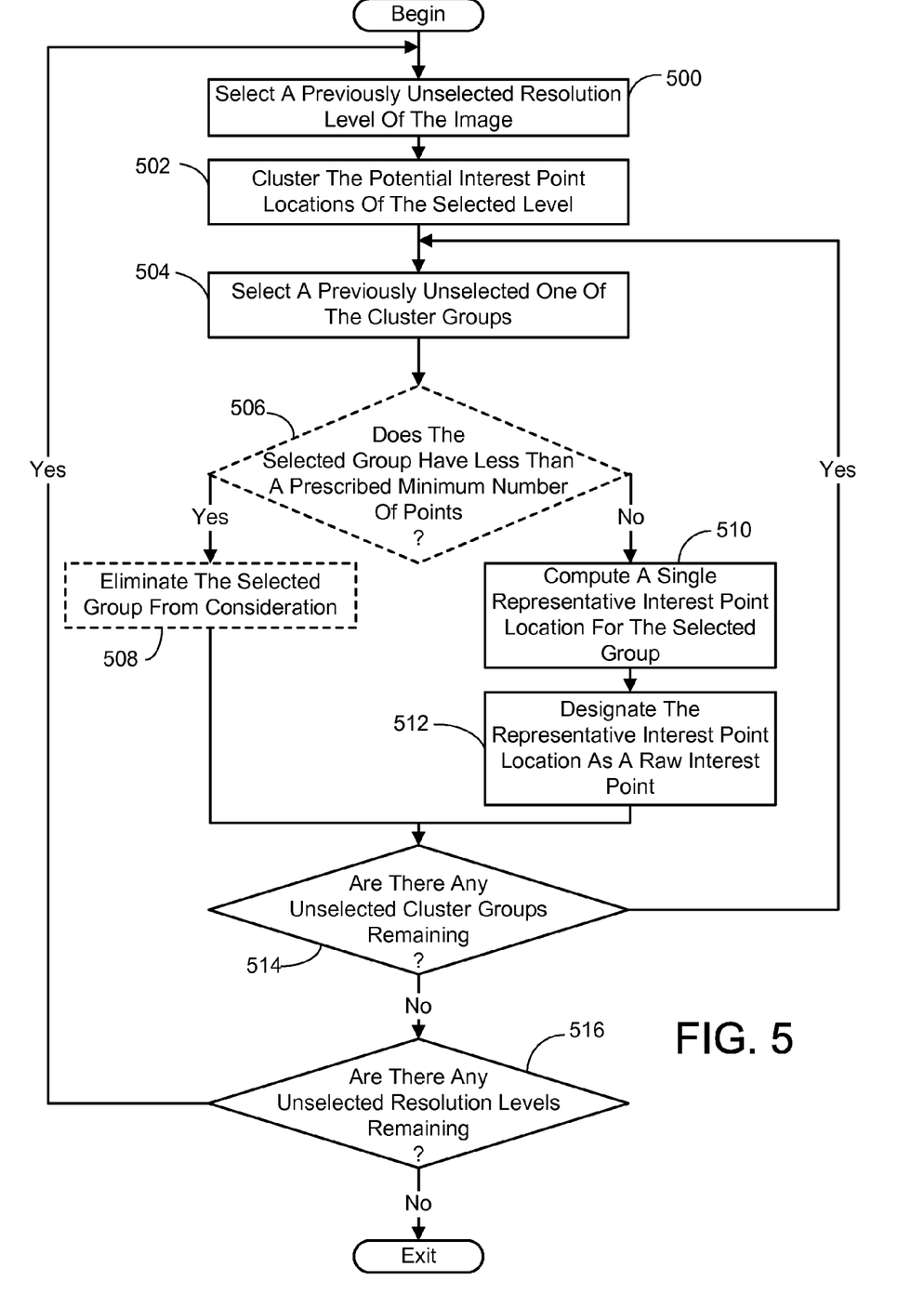
FIG. 5 is a flow diagram generally outlining one embodiment of the clustering stage of the present interest point detection technique.

More particularly, referring to FIG. 5, a previously unselected resolution level of the image is selected (500). The previously designated potential interest point locations of the selected resolution level are clustered (502). Any appropriate clustering procedure can be employed for this purpose. In tested embodiments of the present technique, a flood fill clustering procedure was used. The result of the clustering is the identification of groups of potential interest points that are likely related to the same "strong corner". A previously unselected one of these clustered groups is selected (504). An optional culling of small groups can be undertaken at this point. For example, it can next be determined if the selected group of related potential interest points has less than a prescribed minimum number of points associated therewith (506). If so, the selected group is eliminated from consideration (508), and actions 510 through 512 are skipped. It is noted that the optional nature of the last two actions is indicated in FIG. 5 by the use of broken line boxes.

The prescribed minimum number of points is chosen based on the previously described radius used in the maxima detection stage. More particularly, there will be an approximate expected number of potential interest points identified for each corner depending on the size of the radius used. If the radius is small (e.g., as small as 1 pixel), a smaller number of potential interest points would be expected, whereas if the radius were larger, a greater number of potential interest point would be expected to be identified for a particular corner. Accordingly, the expected number of potential interest points, or a number reasonable close to it, would be chosen as the aforementioned minimum number of points. In tested embodiments where the radius was set to 2, the minimum number of points was set at 5.

Referring again to FIG. 5, if the number of potential interest points in the selected group is equal to or exceeds the prescribed minimum number of points, a single representative interest point location is computed for the selected group (510). This representative location can be computed in a number of ways. For example, a simple average location could be computed. More particularly, if each of the potential interest point locations in the selected group is defined by an (x, y) coordinate, the representative point would be computed as:

$$\left(\frac{\sum x}{N}, \frac{\sum y}{N}\right), \quad (8)$$

where N is the total number of points in the selected group. Another way in which the representative location can be computed is to first identify, for each of the potential interest points in the selected group, the corner strength of the pixel in the cornerness image associated with the resolution level under consideration, which includes in its area the location of the potential interest point. Once the corner strength values have been identified for all the potential interest point locations in the selected group, it is determined which is the largest. The potential interest point location associated with the cornerness image pixel having the largest corner strength value is chosen as the representative location for the selected group. Other methods of choosing a representative location from a clustered group of potential interest points are also possible and can be employed as desired without deviating from the scope of the present technique.

Referring once again to FIG. 5, the next action undertaken in the clustering stage is to designate the single interest point location computed for the selected group as a raw interest point (512). It is then determined if there are any remaining clustered groups that have not yet been selected (514). If there are, then actions 504 through 514 are repeated as appropriate. If not, it is then determined if there are any remaining resolution levels of the image that have not been selected and processed (516). If there are, actions 500 through 516 are repeated as appropriate. Otherwise, the clustering stage ends.

2.5 Position Refinement

Depending on the corner strength values of the pixels in the cornerness images for a neighborhood centered about a raw interest point, it may be possible to refine the interest point location even further. In one embodiment of the present interest point detection technique, this position refinement stage is performed as follows.

Figure 6A:
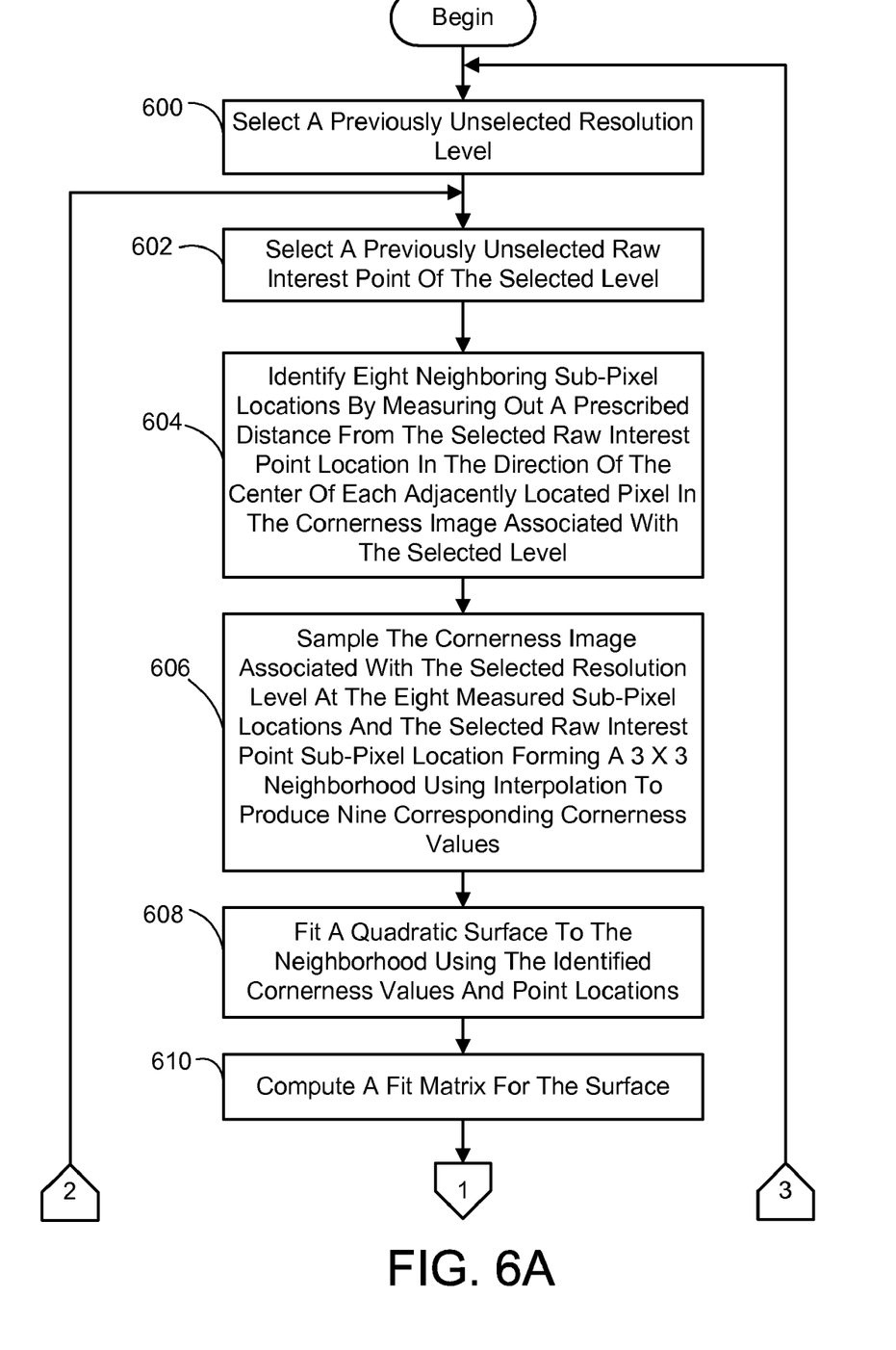
FIGS. 6A-B are a continuing flow diagram generally outlining one embodiment of an optional position refinement stage of the present interest point detection technique.
Figure 6B:
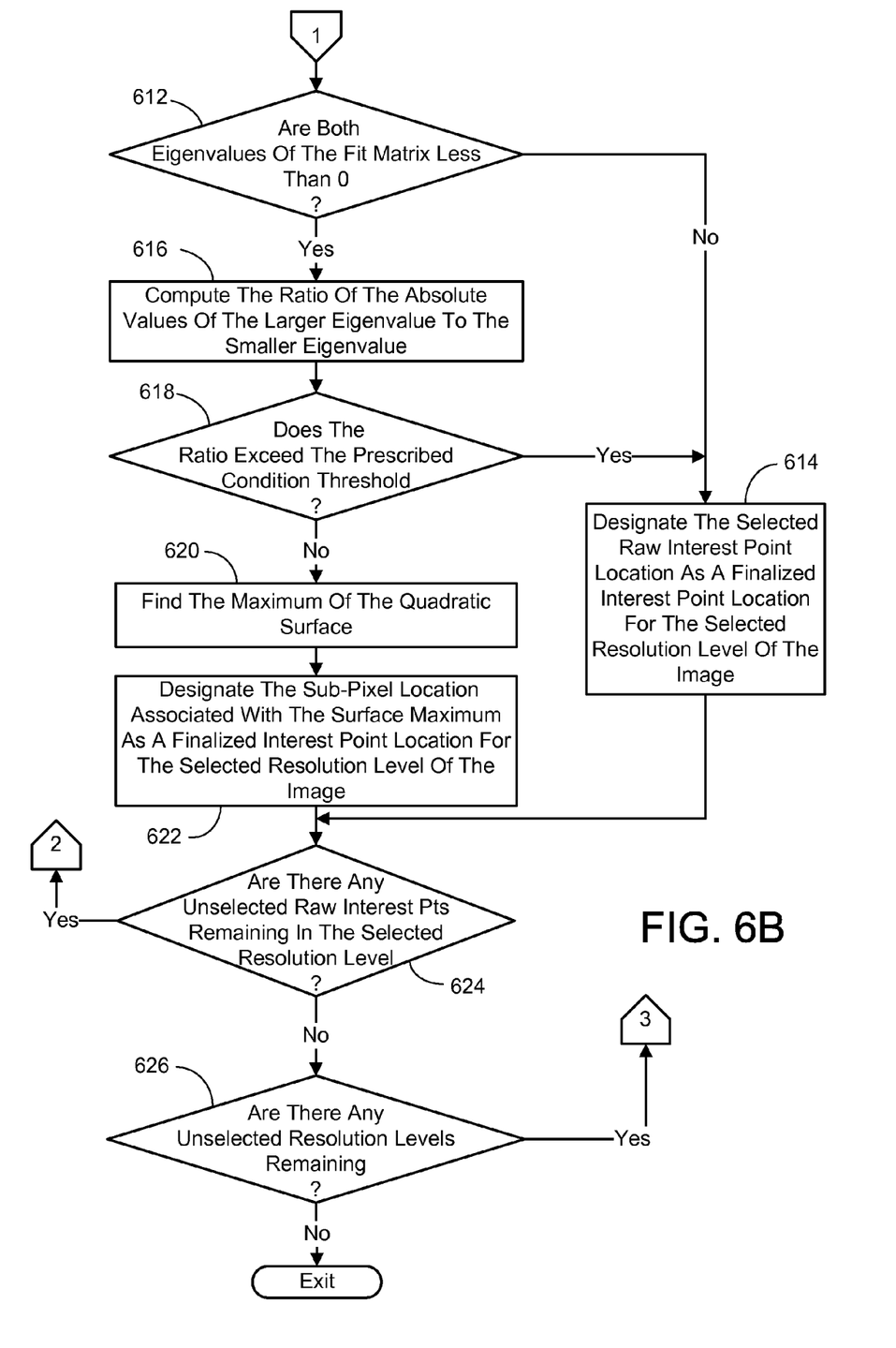

Referring to FIGS. 6A-B, a previously unselected resolution level of the image is selected (600), followed by the selection of a previously unselected raw interest point in the selected level (602). Eight neighboring sub-pixel locations are identified next by measuring out a prescribed distance from the selected raw interest point location in the direction of the center of each adjacently located pixel in the cornerness image associated with the selected resolution level (604). It is noted that in tested embodiments of the present technique, the prescribed distance was set to 1 pixel, as defined by the shortest distance between the centers of adjacent pixels in the cornerness image of the selected resolution level. Thus, in the tested embodiments a 3×3 neighborhood is defined by nine sub-pixel locations (i.e., the sub-pixel location of the selected raw interest point and the eight neighboring measured sub-pixel locations). The cornerness image associated with the selected resolution level is then sampled at these nine sub-pixel locations using interpolation to produce nine corresponding cornerness values (606). As before, any interpolation method can be employed, such as bilinear interpolation, with an assumption that the assigned corner strength value of a pixel is associated with its center.

A quadratic surface is fitted to the 3×3 neighborhood using the identified cornerness values and point locations associated with both the neighboring and central pixels (608). A 2×2 least squares quadratic fit matrix is computed for the surface, which includes the two eigenvalues $\lambda_1$ and $\lambda_2$ (610). Conventional methods are used to accomplish the two foregoing actions. It is noted that if both the eigenvalues are negative (i.e., $\lambda_1 < 0$ and $\lambda_2 < 0$), this indicates the surface has a maximum, as opposed to a minimum or saddle point, and allows for refinement of the raw interest point.

More particularly, it is next determined if both of the eigenvalues are less than 0 (612). If not, location refinement is not possible and the selected raw interest point location is designated a finalized interest point location for the selected resolution level of the image (614). If, however, both of the eigenvalues are less than 0, then the condition number of the fit matrix is examined. More particularly, the ratio of the absolute values of the larger eigenvalue to the smaller eigenvalue is computed (616). It is then determined if the ratio exceeds a prescribed condition threshold (618). The prescribed condition threshold can range from 1 to 10, but a threshold value in the range of 1 to 5 was employed in tested embodiments of the present technique. If the condition threshold is exceeded, then location refinement is not possible and the selected raw interest point location is designated a finalized interest point location for the selected resolution level (614). However, if the computed eignevalue ratio is equal to or less than the condition threshold, refinement is possible. To this end, the maximum of the quadratic surface is found (620) and the associated sub-pixel location of the maximum in the neighborhood is designated as a finalized interest point location for the selected resolution level of the image (622).

It is next determined if there are any remaining unselected raw interest point locations in the selected resolution level (624). If there are, actions 602 through 624 are repeated as appropriate. If not, it is determined if there are any remaining resolution levels of the image that have not been selected and considered (626). If so, actions 600 through 626 are repeated as appropriate. If not, the location refinement ends.

The result of the foregoing technique is a set of interest points for the examined image at a variety of resolution levels corresponding to the aforementioned image pyramid. These interest points can be used for image matching purposes, view-based object recognition, as well as other vision applications.

3.0 Other Embodiments

It is noted that while in the foregoing description of the present interest point detection technique, interest points were identified for each resolution level of an image pyramid derived from the image being assessed. This was done to produce scale invariant interest points. However, this need not be the case, and interest points for the image at its original resolution could be computed exclusively.

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for detecting the location of one or more interest points in an image, comprising using a computer to perform the following process actions:
    forming an image pyramid comprising multiple resolution levels from the image; and
    for each resolution level of the image pyramid,
        generating a cornerness image comprising corner strength values for each pixel thereof,
        identifying one or more potential interest point locations in the cornerness image, wherein each potential interest point location is associated with a pixel that exhibits a higher corner strength value than pixels in a prescribed-sized surrounding pixel neighborhood,
        clustering the potential interest point locations to identify groups thereof that likely derive from a same structure in the resolution level under consideration,
        combining the potential interest point locations in one or more of the identified groups of locations, respectively, to produce a single location that represents the combined group, and
        designating the representative location of each group having one, as a interest point for the resolution level under consideration.

2. The process of claim 1, wherein the process action of generating a cornerness image, comprises an action of using a Harris corner approach that employs a harmonic mean corner detection function.

3. The process of claim 1, wherein the process action of identifying one or more potential interest point locations in the cornerness image, comprises the actions of:
    for each pixel of the cornerness image,
        computing an interpolated corner strength value for each of a set of equally-spaced points located on a circle of a prescribed radius that is centered on the pixel under consideration, assuming the corner strength value of each pixel in the cornerness image is associated with the center of the pixel,
        determining if the interpolated corner strengths of all the equally-spaced points are less than that of the pixel under consideration, and
        whenever the interpolated corner strengths of all the equally-spaced points are less than that of the pixel under consideration, designating the pixel under consideration as the location of a potential interest point.

4. The process of claim 3, wherein said radius ranges between about 1 pixels and about 4 pixels.

5. The process of claim 1, wherein the process action of clustering the potential interest point locations, comprises the actions of:
    for each identified group of potential interest points,
        determining if the group of potential interest points under consideration has less than a prescribed minimum number of points associated therewith; and
        whenever the group of potential interest points under consideration has less than the prescribed minimum number of points, eliminating the group from further consideration in regards to detecting interest point locations.

6. The process of claim 1, wherein the process action of combining the potential interest point locations to produce a single location that represents the combined group, comprises, for each of the identified groups being combined, the actions of:
    computing the average location of the group; and
    designating the average location of the group as the single location that represents the combined group.

7. The process of claim 1, wherein the process action of combining the potential interest point locations to produce a single location that represents the combined group, comprises, for each of the identified groups being combined, the actions of:
    identifying the corner strength value of the each pixel in the cornerness image associated with the resolution level of the image pyramid under consideration which includes in its area the sub-pixel location of a potential interest point in the identified group under consideration;
    determining which corner strength value is the largest among the identified values; and
    designating the potential interest point location whose sub-pixel location is within the pixel in the cornerness image under consideration which was determined to have the largest corner strength value among the identified values, as the single location that represents the combined group.

8. The process of claim 1, further comprising the actions of:
assessing whether an interest point is eligible for location refinement, said assessment comprising determining if a quadratic surface fitted over a local neighborhood of a prescribed size which is centered on the interest point location under consideration exhibits a maximum;
refining the location of eligible interest points;
designating the refined location of the eligible interest points as a final interest point location for the resolution level under consideration; and
designating the location of the interest points as a final interest point location for the resolution level under consideration for those interest points not eligible for location refinement.

9. The process of claim 8, wherein the process action of accessing whether an interest point is eligible for location refinement, comprises the actions of:
identifying eight neighboring sub-pixel locations to the interest point under consideration, said identification comprising measuring out a prescribed distance from the interest point location under consideration in the direction of the center of each adjacently located pixel in the cornerness image associated with the resolution level under consideration to establish neighboring sub-pixel locations;
sample the cornerness image at the eight measured sub-pixel locations and the interest point under consideration using interpolation to produce nine corresponding cornerness values and designating these interpolated values as a neighborhood;
fitting a quadratic surface to the neighborhood using the nine interpolated cornerness values and the sub-pixel locations of the values;
computing a fit matrix for the quadratic surface which comprises two eigenvalues;
determining if both eigenvalues are negative numbers;
deeming the interest point location under consideration to be ineligible for location refinement whenever both eigenvalues are not negative numbers;
whenever it is determined that both eigenvalues are negative numbers, compute the ratio of the absolute values of the larger eigenvalue to the smaller eigenvalue and determine if the ratio exceeds a prescribed condition threshold;
deeming the interest point location under consideration to be ineligible for location refinement whenever it is determined the ratio exceeds the prescribed condition threshold; and
deeming the interest point location under consideration to be eligible for location refinement whenever it is determined the ratio does not exceed or is equal to the prescribed condition threshold.

10. The process of claim 9, wherein the process action of refining the location of eligible interest points, comprises, for each eligible interest point, the actions of:
finding the maximum of the quadratic surface; and
designating the sub-pixel location associated with the maximum of the quadratic surface as a refined interest point location.

11. The process of claim 9, wherein the prescribed distance is set to the shortest distance between the centers of adjacent pixels in the cornerness image associated with the resolution level under consideration.

12. The process of claim 9, wherein the prescribed condition threshold ranges from 1 to 10.

13. A computer-readable medium having computer-executable instructions for performing the process actions recited in claim 1.

14. A system for detecting the location of one or more interest points in an image, comprising:
a general purpose computing device;
a computer program comprising program modules executable by the computing device, wherein the computing device is directed by the program modules of the computer program to,
generate a cornerness image comprising corner strength values for each pixel thereof,
identify one or more potential interest point locations in the cornerness image, wherein each potential interest point location is associated with a pixel that exhibits a higher corner strength value than pixels in a prescribed-sized surrounding pixel neighborhood,
cluster the potential interest point locations to identify groups thereof that likely derive from the same structure in the image, combine the potential interest point locations in one or more of the identified groups of locations, respectively, to produce a single location that represents the combined group, and designate the representative location of each group having one as an interest point for the image.

15. The system of claim 14, further comprising a program module for forming an image pyramid comprising multiple resolution levels prior to executing the generating, identifying, clustering, combining and designating program modules, and wherein the generating, identifying, clustering, combining and designating program modules are executed for each resolution level of the image to designate interest points for each resolution level of the image.

16. The system of claim 14, wherein the program module for identifying one or more potential interest point locations in the cornerness image, comprises sub-modules for:
(a) selecting a previously unselected pixel of the cornerness image;
(b) computing an interpolated corner strength value for each of a set of equally-spaced points located on a circle of a prescribed radius that is centered on the selected pixel;
(c) determining if the interpolated corner strengths of all the equally-spaced points are less than that of the selected pixel;
(d) whenever the interpolated corner strengths of all the equally-spaced points are less than that of the selected pixel, designating the selected pixel as the location of a potential interest point; and
(e) determining if all the pixels of the cornerness image have been selected, and repeating sub-modules (a) through (e) if they have not.

17. The system of claim 16, wherein the program module for clustering the potential interest point locations, comprises sub-modules for:
(a) selecting a previously unselected identified group of the potential interest points;
(b) determining if the selected group of potential interest points has less than a prescribed minimum number of points associated therewith;
(c) whenever the selected group of potential interest points has less than the prescribed minimum number of points, eliminating the group from further consideration in regards to detecting interest point locations; and (d) determining if all the identified groups of the potential interest points have been selected, and repeating sub-modules (a) through (d) if they have not.

18. The system of claim 17, wherein the prescribed minimum number of points of a group of potential interest points is chosen based on the prescribed radius used in identifying one or more potential interest point locations in a cornerness image.

19. The system of claim 14, further comprising program modules for:

assessing whether an interest point is eligible for location refinement, said assessment comprising determining if a quadratic surface fitted over a local neighborhood of a prescribed size which is centered on the interest point location under consideration exhibits a maximum;

refining the location of eligible interest points;

designating the refined location of the eligible interest points as a final interest point location; and designating the location of the interest points as a final interest point location for those interest points not eligible for location refinement.

20. The system of claim 19, wherein the program module for refining the location of eligible interest points, comprises, for each eligible interest point, sub-modules for:

finding the maximum of the quadratic surface; and designating the sub-pixel location associated with the maximum of the quadratic surface as a refined interest point location.

\* \* \* \* \*